United States Patent [19]

Uchida et al.

[11] 4,270,840
[45] Jun. 2, 1981

[54] GLASS FIBERS FOR OPTICAL TRANSMISSION

[75] Inventors: Naoya Uchida, Mito; Shigeyuki Seikai, Nishi; Kozo Yoshimura; Toru Yamanishi, both of Yokohama, all of Japan

[73] Assignees: Nippon Telegraph and Telephone Public Corporation, Tokyo; Sumitomo Electric Industries, Ltd., Osaka, both of Japan

[21] Appl. No.: 42,649

[22] Filed: May 25, 1979

[30] Foreign Application Priority Data

May 25, 1978 [JP] Japan ................... 53-63158

[51] Int. Cl.[3] .................... D02G 3/00; G02B 5/14
[52] U.S. Cl. ..................... 350/96.34; 350/96.33; 428/391; 428/392
[58] Field of Search ............. 428/375, 378, 391, 392, 428/429; 427/163; 65/36; 350/96.23, 96.30, 96.33, 96.34

[56] References Cited

U.S. PATENT DOCUMENTS

| | | | |
|---|---|---|---|
| 2,719,098 | 9/1955 | Goldman | 428/429 X |
| 2,895,846 | 7/1959 | Schaefer | 428/429 X |
| 3,445,267 | 5/1969 | Layne | 427/163 X |
| 3,980,390 | 9/1976 | Yamamoto et al. | 350/96.33 |
| 4,072,400 | 2/1978 | Claypoole | 350/96.33 |
| 4,098,926 | 7/1978 | Nothe | 427/163 |
| 4,114,981 | 9/1978 | Ishida et al. | 350/96.33 |
| 4,167,305 | 9/1979 | Ichiba et al. | 428/392 |

FOREIGN PATENT DOCUMENTS 50-145245 11/1975 Japan .
52-86343 7/1977 Japan .

OTHER PUBLICATIONS

*Electronics Letters*, Mar. 17, 1977, vol. 13, No. 6, pp. 153-154.

*Primary Examiner*—Lorraine T. Kendell
*Attorney, Agent, or Firm*—Sughrue, Rothwell, Mion, Zinn and Macpeak

[57] ABSTRACT

A reinforced glass fiber for use in optical transmission comprising an optical fiber coated with (1) a coating of a first curable organopolysiloxane composition having a refractive index higher than that of the clad glass which forms the outermost layer of the optical fiber, said first curable organopolysiloxane composition being baked, (2) a coating of a second curable organopolysiloxane composition which can be the same as or different from the first curable organopolysiloxane composition, the second curable organopolysiloxane composition being provided on the first curable organopolysiloxane composition and being baked, and (3) optionally a coating of a thermoplastic resin composition.

13 Claims, 5 Drawing Figures

GLASS FIBERS FOR OPTICAL TRANSMISSION

BACKGROUND OF THE INVENTION

1. Field of the Invention

This invention relates to reinforced glass fibers for optical transmission to be adapted for use in optical communications (hereunder referred to as optical fibers).

2. Description of the Prior Art

Since the optical fibers should be 200 mm or less in diameter to retain their flexibility and they are made of a fragile material, it is almost impossible to use them as a transmission line without any protection in view of their mechanical strength.

In addition, it is well known that, as an inherent property, glass has a tendency to lose its strength with time due to the influence of moisture and other factors. Therefore, several prior art techniques have been proposed for covering an optical fiber with a protective coat of plastics or other suitable materials so as to provide the optical fiber with a desired initial strength and a strength that withstands extended use. For example, a coated optical fiber obtained by the method disclosed in Japanese Patent Application (OPI) No. 125754/75 which comprises coating an optical fiber with a thermosetting resin composition (generally referred to as a primary coat) and baking the resin coating and further providing thereon a coating of a melt-extruded thermoplastic resin composition (a secondary coat), possesses satisfactory strength and weatherability sufficient to withstand extended use. Also, as disclosed in Japanese Patent Application (OPI) No. 100734/76, it is known that a spun optical fiber, prior to its contact with another solid object, can be coated with a resin composition which is then baked to provide the fiber with a strength not substantially lower than the virgin strength of the glass.

On the other hand, a stress absorbing layer of small Young's modulus has been provided between the primary coat of thermosetting resin and the secondary coat of thermoplastic resin to eliminate the increased transmission loss due to a so-called "microbending phenomenon" which occurs when an optical fiber is repetitiously bent in small radius. Examples of the materials which have been proposed for the stress absorbing layer are silicone resin, urethane rubber, butadiene rubber, ethylene-propylene rubber and foamed plastics. Of these materials, the silicone resin has been used widely because of its high processability, good curability and weatherability. The term "silicone resin" as used herein refers to a two-part room temperature vulcanizing resin (RTV) which is generally referred to as a curable organopolysiloxane composition.

Of various organopolysiloxanes, dimethyl polysiloxane composition which is generally commercially available has a refractive index of about 1.40 which is lower than the refractive index of glass. Therefore, if dimethyl polysiloxane is directly coated on an optical fiber and then baked, the resulting glass fiber has the following disadvantages.

When an optical fiber having a distribution of refractive index as illustrated in accompanying FIG. 1 is coated with a layer of an organopolysiloxane composition having a refractive index of about 1.40, the resulting transmission system as shown in FIG. 2 comprises the desired transmission system having I as the core and another transmission system having II as the core and the organopolysiloxane as the cladding. Since the transmission system having II as the core suffers an optically higher loss than the system having I as the core, light excited in the region II will be damped in a distance of about ten-odd meters. As a result, estimation of optical transmission in terms of the ratio of the optical output as a point one to two meters away from the incident end ($P_{in}$) to the optical output at a point several hundred to thousand meters away from the incident end ($P_{out}$) cannot be made correctly because $P_{in}$ includes the optical output from the transmission system having II as the core and is therefore over estimated. The second transmission system (or cladding transmission system) having the core of II is undesirable and makes the correct measurement of transmission loss difficult.

In addition, if the light loss in the region of II is relatively low, light excited in the region II will reach the receiving end. On the other hand, the core of an optical fiber is generally prepared by controlling the distribution of its refractive index to obtain a desired level of transmission band (or base-band-frequency characteristics) which is one element of its transmission characteristic. Therefore, emergence of light excited in the region II at the receiving end will seriously degrade the transmission band of the fiber.

It is to be understood that while FIGS. 1 to 3 illustrate examples of the distribution of refractive index of an optical fiber to which this invention is applicable, optical fibers having other distributions of refractive index are included within the scope of this invention.

SUMMARY OF THE INVENTION

A primary object of this invention is therefore to provide a reinforced optical fiber which is free from cladding transmission and has high mechanical strength as well as stable transmission characteristics that can withstand extended use.

Other objects, features and advantages of this invention will be apparent by the following detailed description of the invention in conjunction with the accompanying drawings.

BRIEF DESCRIPTION OF THE DRAWINGS

In FIGS. 1, 2 and 3, the reference numeral 1 represents a core, 2 is a cladding A, 3 is a cladding B, and 4 and 5 are each a coat made of an organopolysiloxane composition.

In FIG. 4, 1 is a core, 4 is a coating of a first curable organopolysiloxane, 5 is a coating of a second curable organopolysiloxane and 6 is a coating of a thermoplastic resin composition.

In FIG. 5, 7 is a spinning furnace, 8 is a fiber rod, 9 is a coating die, 10 is a curing furnace, and 11 is a take-up bobbin.

DETAILED DESCRIPTION OF THE INVENTION

According to this invention, a spun optical fiber, before contacting other solid materials, is coated with a first curable organopolysiloxane composition having a refractive index larger than that of the clad glass which forms the outermost layer of the fiber and the first composition is then baked. The resulting fiber is further coated with a second curable organopolysiloxane composition which can be the same as or different from the first curable organopolysiloxane composition, and the second curable composition is also baked. The glass fiber thus obtained can optionally be coated with a thermoplastic resin composition on the baked second curable composition. The coatings of the first and second curable organopolysiloxane compositions of the thus reinforced optical fiber function both as what are generally referred to as a primary coating and a stress absorptive coating, thus providing a mechanical strength sufficient to withstand the stress under which the fiber is placed during the stranding and sheathing steps for making a cable of the fibers or to withstand extended use in varying environments to be encountered after cable laying as well as making the fiber retain stable transmission characteristics in environments that are likely to cause the effect of microbending.

Figure 1:
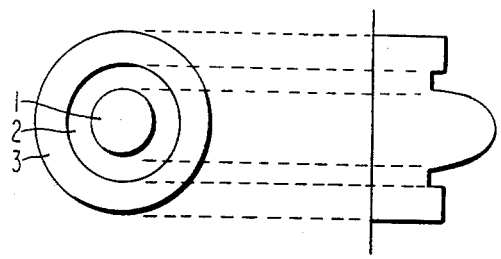
FIGS. 1 and 2 illustrate examples of the distribution of refractive index of the dimethyl polysiloxane coated optical fiber.
Figure 2:
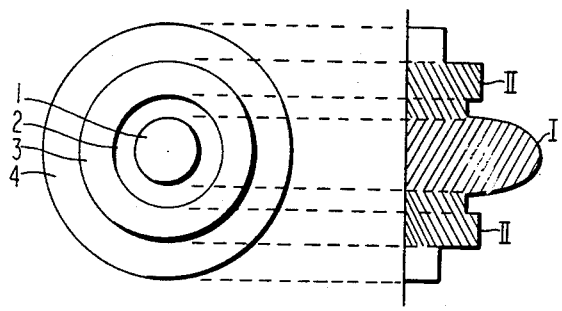
Figure 3:
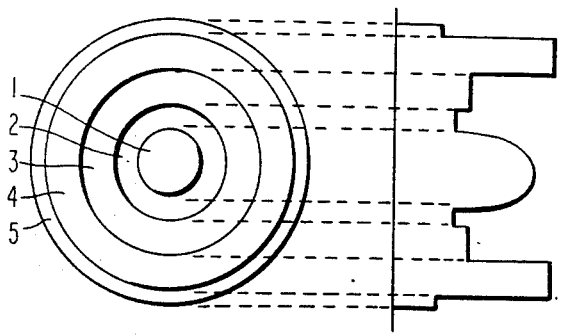
FIG. 3 shows the distribution of refractive index of an optical fiber coated according to this invention.
Figure 4:
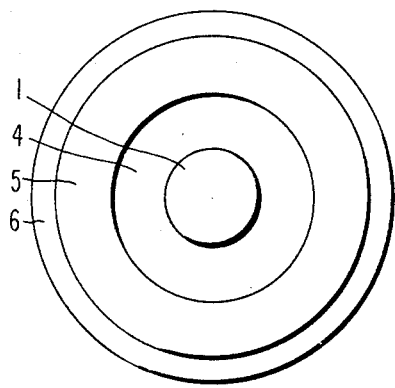
FIG. 4 is a cross section of one preferred embodiment of a reinforced glass fiber according to this invention.

As FIG. 3 shows, this invention uses an organopolysiloxane composition having a refractive index higher than that of the glass which forms the outermost layer of an optical fiber, and so it is able to absorb and inhibit an undesirable transmission mode and achieve correct measurement of transmission loss without degrading the transmission band.

Generally, curable organopolysiloxane composition having a refractive index higher than that of glass according to the present invention has a basic structure comprising the polysiloxane bond of Si—O—Si and phenyl groups as side chain substituents. Such phenyl polysiloxane composition basically comprises (i) a component

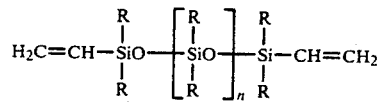

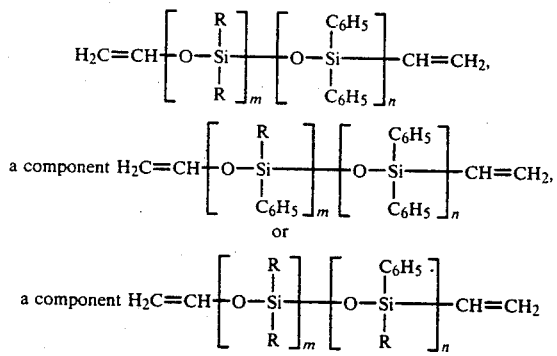

wherein R is a substituted or unsubstituted univalent hydrocarbon group having no aliphatic unsaturation, (ii) an organohydrodiene polysiloxane component having in its molecule at least 3 hydrogen atoms directly bonded to a silicon atom contained in an amount sufficient to provide 0.7 to 5 such hydrogen atoms per vinyl group of the component (i), and (iii) a catalytic amount of platinum compound. Examples of the suitable platinum compound are those which are highly compatible with the above two components, such as an olefin complex, or a chloroplatinic acid in which part of chlorine may or may not be substituted with alcohol, aldehyde or ketone. For the purpose of increasing the mechanical strength of the cured product and fluidity of the composition, these three components may be combined with an organopolysiloxane composition comprising $(CH_2=CH)R_2SiO_{0.5}$, $R_3SiO_{0.5}$ and $SiO_2$ (wherein R is a substituted or unsubstituted uni-valent hydrocarbon group having no aliphatic unsaturation, the molar ratio of the sum of $(CH_2=CH)R_2SiO_{0.5}$ and $R_3SiO_{0.5}$ to $SiO_2$ being in the range of from 0.5 to 2.0 and the content of vinyl group being in the range of from 0.5 to 3 wt%. The phenyl content in this phenyl polysiloxane composition can be changed to control its refractive index within the range of from about 1.40 to about 1.52. In the formulae m and n are positive integers such that the phenyl polysiloxane composition has the desired refractive index and a viscosity at 25° C. of from 50 to 100,000 centistokes, preferably from 1,000 to 10,000 centistokes.

A curable organopolysiloxane composition having a refractive index lower than that of glass basically comprises (i) a component $$H_2C=CH-\underset{\underset{R}{|}}{\overset{\overset{R}{|}}{Si}}O\left[\underset{\underset{R}{|}}{\overset{\overset{R}{|}}{Si}}O\right]_n\underset{\underset{R}{|}}{\overset{\overset{R}{|}}{Si}}-CH=CH_2$$

(wherein R is a substituted or unsubstituted uni-valent hydrocarbon group having no aliphatic unsaturation), (ii) an organohydrodiene polysiloxane component having in its molecule at least 3 hydrogen atoms directly bonded to a silicon atom contained in an amount sufficient to provide 0.7 to 5 such hydrogen atoms per vinyl group in the above defined component, and a catalytic amount of a platinum compound. Examples of the suitable platinum compound are those which are highly compatible with the above two components, such as an olefin complex or a chloroplatinic acid in which part of chlorine may or may not be substituted with alcohol, aldehyde or ketone. This resin composition generally has a refractive index ranging from 1.40 to 1.41. For the purpose of increasing the mechanical strength of the cured product and fluidity of the composition, these three components may be combined with an organopolysiloxane composition comprising the units of $(CH_2=CH)R_2SiO_{0.5}$, $R_3SiO_{0.5}$, and $SiO_2$ wherein R is a substituted or unsubstituted univalent hydrocarbon group having no aliphatic unsaturation), the molar ratio of the sum of $(CH_2=CH)R_2SiO_{0.5}$ and $R_3SiO_{0.5}$ to $SiO_2$ being in the range of from 0.5 to 2.0 and the content of vinyl group being in the range of from 0.5 to 3 wt%. Being a positive integer, n in the formula above of the curable polysiloxane composition is desirably such that said composition has a viscosity at 25° C. of from 50 to 1,000,000 centistokes, preferably from 500 to 10,000 centistokes.

The most preferred organopolysiloxane composition having a refractive index lower than that of glass is such that R in the above formula is a methyl group.

Figure 5:
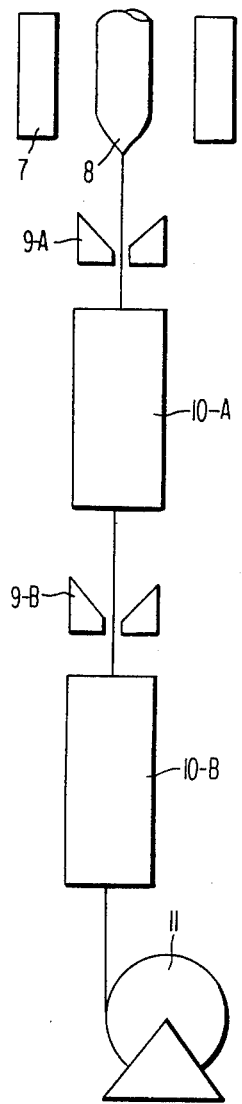
FIG. 5 illustrates one embodiment of the apparatus for coating and baking the organopolysiloxane composition.

Both the first and second curable organopolysiloxane compositions must be cured fast since they are coated and baked with the apparatus illustrated in FIG. 5. The thermosetting organopolysiloxane compositions described hereinabove are cured at a rate high enough to permit production of an optical fiber as illustrated in FIG. 5. To further increase the production speed of the optical fibers, a photosetting organopolysiloxane composition having incorporated at terminals of the main chain or in side chains a vinyl group, a mercapto group or acryl group may be employed.

Examples of suitable photosetting organopolysiloxane compositions are those which comprise a component

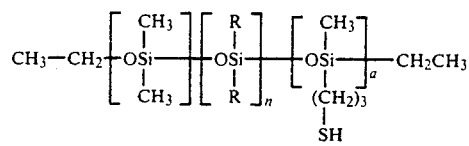

a component

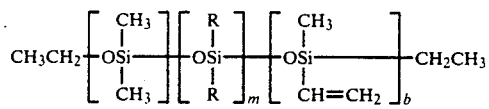

and a benzoin photosensitizer, or which comprise a component

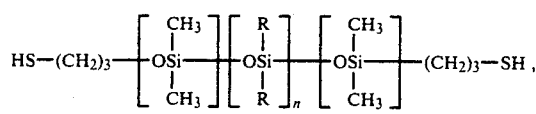

a component

and a benzoin photosensitizer. The refractive index of the photosetting organopolysiloxane composition can be controlled by using either methyl groups for R or phenyl groups for R in the above formulae. While the above examples refer to a benzoin sensitizer it will be apparent to one skilled in the art that other equally well known photosensitizers can be used as well.

The curable organopolysiloxane compositions to be used in this invention are required to afford, after curing, a Young's modulus which is sufficiently small to absorb any external stress and prevent the resultant optical fiber from bending in a small radius. According to the study of the present inventors, an organopolysilosane composition which affords, after curing, a Young's modulus of 2.0 kg/mm$^2$ or more is ineffective as a stress absorptive material and experiences an increase in transmission loss with changes in temperature and other factors. A cured organopolysiloxane composition preferably has a Young's modulus of 0.5 kg/mm$^2$ or less.

According to this invention, the first curable organopolysiloxane composition must have a refractive index higher than that of glass, but there is no limit on the refractive index of the second curable organopolysiloxane composition. Since a phenyl polysiloxane composition is more expensive than a dimethyl polysiloxane composition, it is desirable to use the dimethyl polysiloxane composition as the second curable organopolysiloxane composition of the present invention. However, in addition to its low price, a dimethyl polysiloxane composition of low refractive index has the advantage that its molecular structure permits faster curing of the composition than a phenyl polysiloxane composition of high refractive index. It is therefore desirable that only the first layer of coating which is essential to the reinforced glass fiber of this invention be made of a phenyl polysiloxane composition of high refractive index and that the second layer of coating be made of a dimethyl polysiloxane composition.

It is to be noted that the second curable organopolysiloxane composition need not be formed of a single layer; instead, it may have a multilayer structure composed of the same or different materials. The second curable organopolysiloxane layer may be coated with a thermoplastic layer which functions as an additional stress absorbing layer. The production speed of optical fibers may be increased by replacing the curable organopolysiloxane composition with a non-photosetting resin composition containing a vinyl group, a mercapto group or an acrylate group.

The thermoplastic resin composition may used in the thermoplastic layer independently or as a mixture will all or any of an additive resin, an inorganic filler, an organic filler, a cross-linking agent, pigment or dye. The resin composition must be such that it can be melt-extruded for coating on a glass fiber. While practically all kinds of thermoplastic resin can suitably be used for the purposes of this invention, preferred examples are polyamide, polyester, polycarbonate, polyurethane, polyethylene, polypropylene, ionomer resin, polyvinyl chloride, and an ethylene-vinyl acetate copolymer.

This invention will now be described in greater detail by reference to the following Examples which are given for illustrative purposes only and are by no means meant to limit the scope of this invention.

EXAMPLE 1

A fiber rod composed mainly of quartz and having an outside diameter of about 15 mm was heated in a resistance-inductance furnace (designated by the number 7 in FIG. 10) and spun into a fiber having an outside diameter of 125 μm. Before the fiber contacted another solid object, it was passed through a coating die (9-A in FIG. 10) where it was coated with a phenyl polysiloxane composition (OF 103, a product of Shinetsu Chemical Industries Co., Ltd.) transferred to an electric heating type curing furnace (10-A in FIG. 10) for curing, then passed through a coating die (9-B in FIG. 10) where it was coated with a dimethyl polysiloxane composition (KE 103 RTV, a product of Shinetsu Chemical Industries Co., Ltd.) transferred to an electric heating type curing furnace (10-B in FIG. 10) for curing, and finally accumulated by a take-up bobbin (11 in FIG. 10). Cured OF 103 and KE 103 each had a Young's modulus of about 0.05 kg/mm$^2$. A screw type extruding machine was used to coat the fiber with Nylon-12 (Diamide N-1940, a product of Daicel Ltd., Japan) by melt extrusion. The thicknesses of the phenyl polysiloxane composition, dimethyl polysiloxane composition and Nylon-12 coated were 200 μm, 350 μm and 0.9 μm, respectively. The coating speed for each layer was 30 m/min.

EXAMPLE 2

The procedure of Example 1 was repeated to produce a reinforced optical fiber except that the phenyl polysiloxane composition was CY-52-151 (a product of Toray Silicone), the dimethyl polysiloxane composition was CY-52-016 (a product of Toray Silicone) and the thermoplastic resin was HDPE (Hizer 5300, a product of Mitsui Petrochemical Industries, Japan). Cured CY-52-151 and CY-52-016 each had a Young's modulus of 0.05 kg/mm$^2$. The thickness of each coating and its coating speed were the same as in Example 1.

EXAMPLE 3

The procedure of Example 1 was repeated to produce a reinforced optical fiber except that the phenyl polysiloxane composition was photosetting X-32-296 (a product of Shinetsu Chemical Industries Co., Ltd.) the dimethyl polysiloxane composition was photosetting X-62-719 (a product of Shinietsu Chemical Ind. Co., Ltd.) both of which were cured with a 20 cm long mercury lamp (rated power: 2 kw), and that the thermosetting resin was polybutylene terephthalate (PBT 1401, a product of Toray). Cured X-32-296 and X-62-719 each had a Young's modulus of 0.05 kg/mm$^2$. The coating and baking speed of phenyl and dimethyl polysiloxane compositions were 100 m/mm, and the extrusion/coating speed of polybutylene terephthalate was 30 m/min. The thickness of each coating was the same as in Example 1.

The reinforced optical fibers produced in Examples 1 to 3 had the advantages that (1) they were free from undesirable transmission modes, (2) they had an average strength of 3.5 GN/m$^2$, (3) they could be used at a temperature in the range of from $-60°$ C. to $+170°$ C. without experiencing an increase in transmission loss, and that (4) no variation in transmission loss would occur during cable making and laying procedures.

While the invention has been described in detail and with reference to specific embodiments thereof, it will be apparent to one skilled in the art that various changes and modifications can be made therein without departing from the spirit and the scope thereof.

What is claimed is:

1. A reinforced glass fiber for use in optical transmission comprising an optical fiber having provided thereon (1) a coating of a first curable organopolysiloxane composition having a refractive index higher than the glass which forms the outermost layer of the glass fiber, said first curable organopolysiloxane composition being baked to cure the same, and (2) a coating of a second organopolysiloxane composition which can be the same as or different from the first curable organopolysiloxane composition, said second curable organopolysiloxane composition then being provided on the first curable organopolysiloxane and being baked to cure the same, wherein at least one of the first and second curable organopolysiloxane compositions has a stress absorbing effect and a Young's modulus lower than 2.0 kg/mm$^2$ at room temperature.

2. The glass fiber of claim 1, wherein at least the first curable organopolysiloxane composition is a phenyl polysiloxane composition.

3. The glass fiber of claim 1, wherein at least one of the first and second curable organopolysiloxane compositions is a photosetting curable organopolysiloxane composition.

4. The glass fiber of claim 1, wherein the second curable organopolysiloxane composition is a dimethyl polysiloxane composition.

5. The glass fiber of claim 1, wherein the second curable organopolysiloxane composition has a multilayer structure composed of the same or different materials.

6. The glass fiber of claim 1, wherein a coating of thermoplastic resin composition is provided on said second curable organopolysiloxane composition.

7. The glass fiber of claim 1, wherein said second curable organopolysiloxane composition is the same as said first curable organopolysiloxane composition.

8. The glass fiber of claim 1, wherein said second curable polyorganopolysiloxane composition is different from said first curable organopolysiloxane composition.

9. The glass fiber of claim 2, wherein said phenylpolysiloxane composition comprises:

(i)(a) a component of the formula

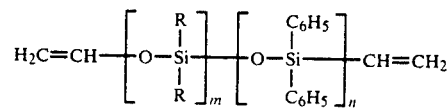

(i)(b) a component of the formula

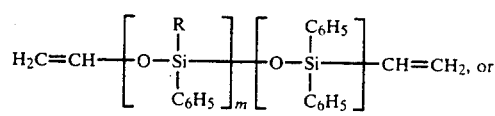

a component of the formula

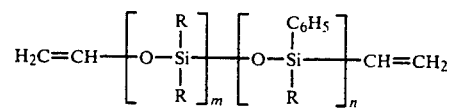

wherein R is a substituted or unsubstituted monovalent hydrocarbon group having a aliphatic unsaturation, (ii) an organohydrodiene polysiloxane component having in its molecule at least 3 hydrogen atoms directly bonded to a silicon atom in an amount sufficient to provide 0.7 to 5 such hydrogen atoms per vinyl group of the component (i), and (iii) a catalytic amount of a platinum compound, wherein m and n are positive integers such that the phenylpolysiloxane composition has a refractive index of about 1.40 to about 1.52 and a viscosity at 25° C. of from 50 to 100,000 centistokes.

10. The glass fiber of claim 9, wherein said second curable organopolysiloxane composition has a refractive index lower than that of glass and comprises (i) a component of the formula

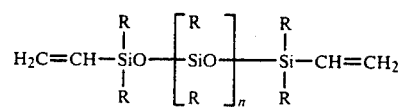

wherein R is a substituted or unsubstituted mono-valent hydrocarbon group having no aliphatic unsaturation, (ii) an organohydrodiene polysiloxane component having in its molecule at least 3 hydrogen atoms directly bonded to a silicon atom in an amount sufficient to provide 0.7 to 5 such hydrogen atoms per vinyl group in the above defined component, and (iii) a catalytic amount of a platinum compound, said composition having a refractive index ranging from 1.40 to 1.41, and n being such that such composition has a viscosity at 25° C. of from 50 to 1,000,000 centisokes.

11. The composition of claim 10, wherein in said second curable organopolysiloxane composition R is a methyl group.

12. The glass fiber of claim 10, wherein said Young's modulus is 0.5 kg/mm$^2$ or less.

13. The glass fiber of claim 10, wherein said first and second curable organopolysiloxane compositions consist essentially of the recited components.

* * * * *